United States Patent [19]
Gotoh

[11] Patent Number: 5,909,949
[45] Date of Patent: Jun. 8, 1999

[54] HEAD LAMP DEVICE FOR VEHICLE

[75] Inventor: Shinichiro Gotoh, Wako, Japan

[73] Assignee: Honda Giken Kogyo Kabushiki Kaisha, Tokyo, Japan

[21] Appl. No.: 08/868,184

[22] Filed: Jun. 3, 1997

[30] Foreign Application Priority Data

Jun. 3, 1996 [JP] Japan .................................. 8-140488

[51] Int. Cl.$^6$ .................................................. B60Q 1/08
[52] U.S. Cl. .......................... 362/37; 362/466; 362/465; 315/82
[58] Field of Search ............................ 362/37, 40, 466, 362/524, 465; 315/79, 82

[56] References Cited

U.S. PATENT DOCUMENTS

| | | | |
|---|---|---|---|
| 4,858,080 | 8/1989 | Oikawa ................................ | 362/466 |
| 4,870,545 | 9/1989 | Hatanaka et al. ..................... | 362/466 |
| 5,526,242 | 6/1996 | Takahashi et al. .................... | 362/466 |
| 5,562,336 | 10/1996 | Gotou . | |
| 5,588,733 | 12/1996 | Gotou . | |
| 5,645,338 | 7/1997 | Kobayashi ............................ | 362/466 |

FOREIGN PATENT DOCUMENTS

62-77249  4/1987  Japan .
314742  1/1991  Japan .

Primary Examiner—Thomas M. Sember
Attorney, Agent, or Firm—Carrier, Blackman & Associates, P.C.; Joseph P. Carrier; William D. Blackman

[57] ABSTRACT

A head lamp device for a vehicle capable of changing a lighting region in front of the vehicle in right and left directions, in which change of the lighting region is suppressed so as not to give the driver a sense of incongruity when a steering wheel is operated in one direction and then rapidly in the other as in case of counter-steering. The device comprises a lighting region changing mechanism for changing the lighting region of the head lamp; a steering angle sensor for detecting a steering angle; a turning movement detector for detecting a turning movement of the vehicle body in right and left directions; a first lighting angle calculating mechanism for calculating a first lighting angle based on the steering angle detected by the steering angle sensor; a second lighting angle calculating mechanism for calculating a second lighting angle based on the turning movement detected by the turning movement detector; a lighting angle deciding mechanism for deciding a final lighting angle from the first lighting angle and the second lighting angle; and a controller for controlling the lighting region changing means to change the lighting region on the basis of the final lighting angle.

19 Claims, 6 Drawing Sheets

PRIOR ART

FIG. 8

HEAD LAMP DEVICE FOR VEHICLE

BACKGROUND OF THE INVENTION

1. Field of the Invention

This invention relates to light distribution control of a head lamp device for changing a lighting region in right and left directions.

2. Discussion of Relevant Art

Hitherto, various head lamp devices capable of changing a lighting region in right and left directions have been proposed. In almost of all of them, basically the lighting region of a head lamp is controlled to change in response to a steering angle of the steering wheel (Japanese Laid-Open Patent Publications No. Sho 62-77249, No. Hei 3-14742 etc.) and the lighting region of the head lamp is changed to a direction of the steering operation to increase a lighting amount in the direction to which the vehicle is just going to advance.

If the lighting angle is controlled in response to the steering angle only as above, when the steering operation is rapid, the lighting angle is also changed rapidly in response to rapid change of the steering angle so that the lighting region is swung in right and left directions and largely in a moment to give the driver a sense of incongruity.

Figure 8:
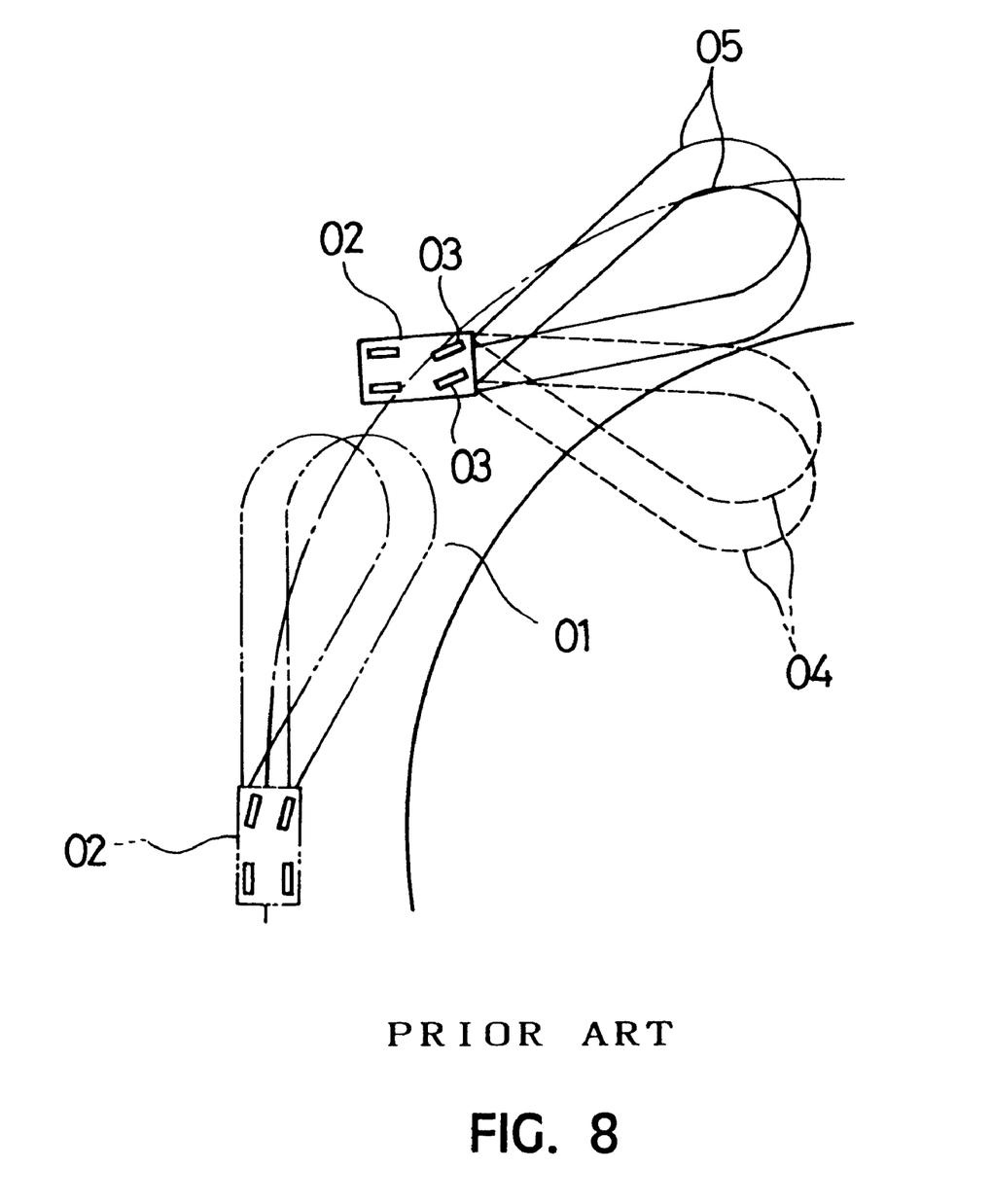
FIG. 8 is an illustration for showing change of the lighting region on counter-steering in a prior art.

When a vehicle goes around a curve, for example, if the steering wheel is turned through too large an angle as compared with the vehicle speed, or the road surface is in a slippery state such as a snowy road, sometimes the rear part of the vehicle projects outwardly such that it directs the vehicle inward too much. FIG. 8 shows such a state in which a vehicle 02 shown by the solid line is directed inward too much on a midway of a road curving to the right.

In such a case, if the steering wheel is left in the state turned to the right, the vehicle 02 turns round, however by reversing the turning direction of the steering wheel (counter-steering) the direction of the vehicle body can be recovered. In FIG. 8, therefore the steering wheel is turned to the left by counter-steering so that the front wheels 03 are directed leftward with respect to the vehicle body.

If the lighting region of the vehicle 02 is changed in response to the steering angle, before the steering wheel is reversed to the left direction, the region on the right side with respect to the front of the vehicle body is lighted as shown by the dotted line 04 in FIG. 8, and after the counter-steering, the lighting region is directed to the left side with respect to the front of the vehicle body as shown by the solid line 05.

As the counter-steering is carried out instantaneously, the lighting region is changed instantaneously from the region 04 to the region 05, and the rapid and large change of the lighting region gives the driver a sense of incongruity.

SUMMARY OF THE INVENTION

The present invention has been accomplished in view of the foregoing and it is an object of the present invention to provide a head lamp device for a vehicle in which a change of a lighting region is suppressed so as not to give the driver a sense of incongruity even if a steering wheel is operated in reverse rapidly as in case of the counter-steering and the like.

In order to accomplish the aforesaid object, the present invention provides a lamp device for a vehicle capable of changing a lighting region in front of the vehicle in right and left directions, comprising a head lamp lighting region changing means for changing the lighting region of the head lamp; steering angle detecting means for detecting a steering angle; turning movement detecting means for detecting a turning movement of the vehicle body in right and left directions; first lighting angle calculating means for calculating a first lighting angle based on the steering angle detected by the steering angle detecting means; second lighting angle calculating means for calculating a second lighting angle based on the turning movement detected by the turning movement detecting means; lighting angle deciding means for deciding a final lighting angle from the first lighting angle and the second lighting angle; and control means for controlling the lighting region changing means to change the lighting region based on the final lighting angle.

Since the final lighting angle is not decided from only the first lighting angle based on the steering angle, but is decided in view of both the first lighting angle and the second lighting angle based on the turning movement, change of the lighting region can be suppressed properly so as not to give the driver a sense of incongruity even if the steering wheel is operated in one direction and then rapidly in the other.

The lighting angle deciding means may decide the second lighting angle, which is based on the turning movement, as the final lighting angle when the first and second lighting angles exist on opposite sides to each other with respect to a direct front of the vehicle body, and may decide the larger of either of the first and second lighting angles as the final lighting angle when the first and second lighting angles exist on the same side with respect to the direct front of the vehicle body.

When the vehicle goes around a curve, in the beginning of entering the curve, the steering angle precedes the turning movement and the first lighting angle based on the steering angle is typically larger than the second lighting angle based on the turning movement on the same side. At that time, if the steering wheel is operated in the reverse direction, the first lighting angle based on the steering angle becomes smaller than the second lighting angle based on the turning movement, because the steering angle becomes small rapidly while change of the turning movement is slow due to inertia.

Accordingly, when the first and second lighting angles exist on the same side and the first lighting angle based on the steering angle is larger than the second lighting angle based on the turning movement, the lighting region is changed using the first lighting angle as the final lighting angle, and after the first lighting angle based on the steering angle becomes smaller than the second lighting angle based on the turning movement, the lighting region is changed using the second lighting angle, which changes slowly and is large, as the final lighting angle. Further, even if the first lighting angle moves on the opposite side of one direct front of the vehicle body to the second lighting angle, the second lighting angle based on the turning movement is used as the final lighting angle. Thus, even if the steering wheel is operated in one direction and then rapidly in the other, change of the lighting region can be suppressed properly to protect the driver from a sense of incongruity.

The lighting angle deciding means may decide a direction of the direct front of the vehicle body as a final lighting direction when the first and second lighting angles exist on opposite sides to each other with respect to the direct front of the vehicle body; may decide a lighting angle based on the steering angle as the final lighting angle when the first and second lighting angles exist on the same side with respect to the direct front of the vehicle body and the first lighting angle is larger than the second lighting angle; and may decide the direction of the direct front of the vehicle body as a final lighting direction when the first and second lighting angles exist on the same side with respect to the direct front of the vehicle body and the first lighting angle is smaller than the second lighting angle.

When the first lighting angle based on the steering angle is larger than the second lighting angle based on the turning movement, change of the lighting region is controlled using the first lighting angle based on the steering angle as the final lighting angle, and when the first lighting angle based on the steering angle becomes smaller than the second lighting angle based on the turning movement, the direction of the direct front of the vehicle body is decided as the final lighting direction, and even if the first and second lighting angles come to exist on opposite sides of the direct front to each other, the direction of the direct front of the vehicle body is decided as the final lighting direction and the lighting region is controlled to the direct front of the vehicle body. Thus, when the steering wheel is operated in one direction and then rapidly in the other, the lighting region is set at the direct front of the vehicle body so that change of the lighting region can be suppressed properly so as not to give the driver a sense of incongruity.

In an aspect of the present invention, when the first and second lighting angle exist on the same side with respect to a direct front of the vehicle body, if the first lighting angle is larger than the second lighting angle, a lighting angle based on the steering angle is decided as the final lighting angle, and if the first lighting angle is changed to be smaller than the second lighting angle, a lighting angle at the time of changing is decided as the final lighting angle and fixed. After that if the first and second lighting angles change so as to exist on opposite sides to each other with respect to the direct front of the vehicle body, a lighting angle at the time of change is decided as the final lighting angle and fixed.

When the first lighting angle based on the steering angle is larger than the second lighting angle based on the turning movement, the first lighting angle based on the steering angle is decided as the final lighting angle and the lighting angle is fixed. When the first lighting angle based on the steering angle becomes smaller than the second lighting angle based on the turning movement, the lighting angle at that time is fixed as the final lighting angle and even if the first and second lighting angles come to exist on opposite sides to each other relative to the direct front of the vehicle body, and the lighting angle is kept fixed. Thus, when the steering wheel is operated rapidly, the lighting region is fixed so as not to give the driver a sense of incongruity.

If vehicle speed detecting means for detecting vehicle speed is provided, and the turning movement detecting means detects a yaw angular velocity of yawing of the vehicle body, and the second lighting angle calculating means further calculates the second lighting angle on the basis of the yaw angular velocity and the vehicle speed detected by the vehicle speed detecting means, an exact second lighting angle based on the yawing of the vehicle body can be calculated.

The second lighting angle calculating means may calculate a turning radius of the vehicle from the yaw angular velocity and the vehicle speed to obtain the second lighting angle in accordance with the turning radius. A second lighting angle adapted to a curve of a road can correspondingly be calculated.

If vehicle speed detecting means for detecting vehicle speed is provided, and the first lighting angle calculating means corrects the steering angle detected by the steering angle detecting means in accordance with the vehicle speed detected by the vehicle speed detecting means to obtain the first lighting angle, it is possible to make the first lighting angle based on the steering angle an exact angle according to the vehicle speed.

DETAILED DESCRIPTION OF THE PREFERRED EMBODIMENT

Hereinafter, a preferred embodiment of the present invention will be described with reference to FIGS. 1 to 7.

Figure 1:
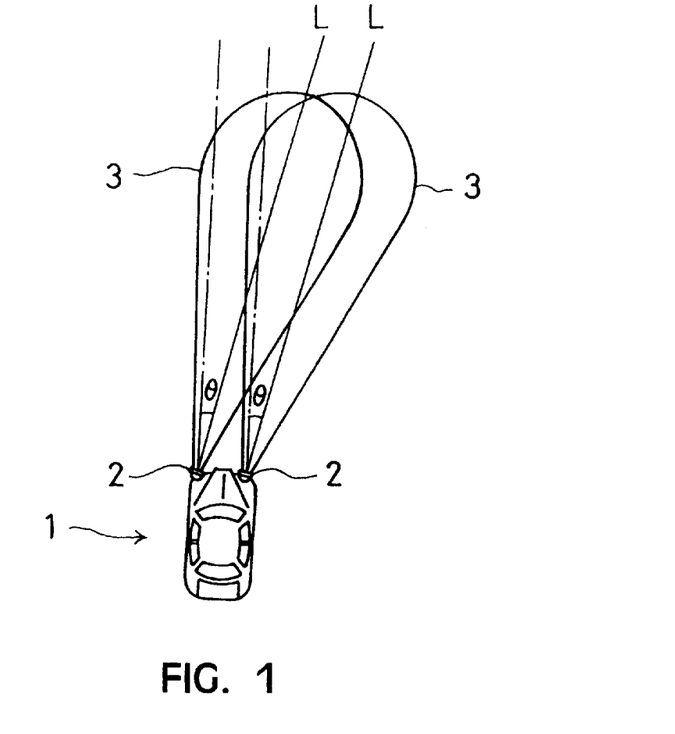
FIG. 1 is a view showing lighting regions of a vehicle of one embodiment of the present invention as viewed from above.

The vehicle 1 of the preferred embodiment has head lights 2 for lighting the space in front of the vehicle installed such that they are swingable in rightward and leftward horizontal directions. FIG. 1 is a view showing the vehicle 1 from above and in this figure, the right and left head lights 2, 2 are swung rightward so as to cause the right forward regions to become lighting regions 3, 3.

The right and left head lights 2, 2 are swung together in the same direction by the same angle and as shown in FIG. 1, angles of their optical axes L, L with respect to an advancing direction of the vehicle, i.e. lighting angle, are both set to be $\theta$. Regarding the angle $\theta$, that on the right side with respect to the advancing direction is given plus sign and that on the left is given minus sign.

Alternatively, only a head light on the turning side may be swung or the right and left head lights may be swung by respective angles different from each other.

Figure 2:
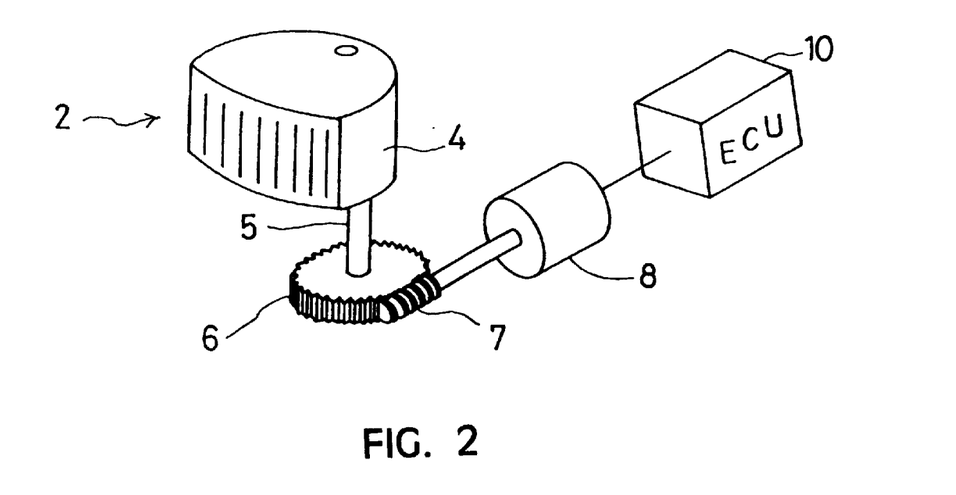
FIG. 2 is a schematic perspective view showing a swinging mechanism for a head light of the preferred embodiment.

A swinging mechanism for swinging the head light 2 in the preferred embodiment is schematically shown in FIG. 2, wherein a lamp unit 4 of the head light 2 is fixed to a rotary shaft 5, and a worm gear 7 formed at an end of a driving shaft of a motor 8 is engaged with a worm wheel 6 fitted to the rotary shaft 5.

Accordingly, the lamp unit 4 is swung together with the rotary shaft 5 through an engagement between the worm gear 7 and the worm wheel 6 under a driving of the motor 8. The motor 8 is controlled for its driving by a light distribution control ECU 10.

Figure 3:
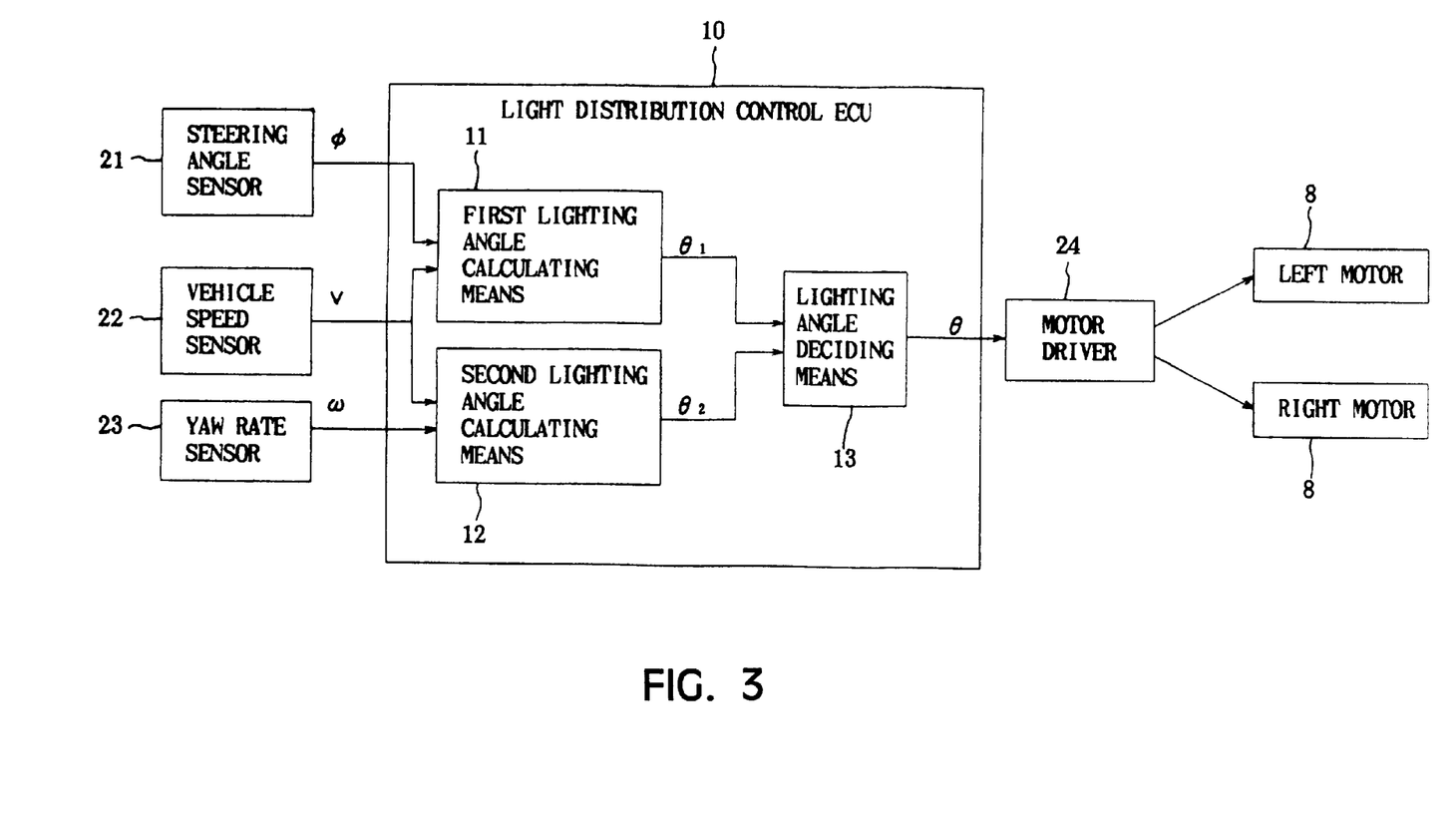
FIG. 3 is a rough block diagram showing a control system for changing the lighting region.

FIG. 3 is a rough block diagram showing a control system for changing the lighting region in the present embodiment. The vehicle has a steering angle sensor 21 for detecting a direction of a front wheel with respect to the vehicle body, i.e. a steering angle $\phi$, a vehicle speed sensor 22 for detecting a vehicle speed v and a yaw rate sensor 23 for detecting a yaw angular velocity (yaw rate) $\omega$.

The steering angle φ detected by the steering angle sensor 21 and the vehicle speed v detected by the vehicle speed sensor 22 are inputted into a first lighting angle calculating means 11 in the light distribution control ECU 10, and a first lighting angle $\theta_1$ is calculated by the following formula (1).

$$\theta_1 = K(v) \times \phi \tag{1}$$

Wherein K(v) is a correction coefficient determined based on the vehicle speed v and about proportional to the vehicle speed v. The maximum value of the K(v) is 1.

In such a manner, the first lighting angle calculating means 11 calculates the first lighting angle $\theta_1$ based on the steering angle φ and corrected in accordance with the vehicle speed v so that an appropriate first lighting angle $\theta_1$ corresponding to the vehicle speed v can be obtained.

The vehicle speed v detected by the vehicle speed sensor 22 and the yaw angular velocity detected by the yaw rate sensor 23 are inputted into a second lighting angle calculating means 12 in the light distribution control ECU 10 to calculate a second lighting angle $\theta_2$.

In the second lighting angle calculating means 12, firstly a turning radius of the vehicle is obtained from the vehicle speed v and the yaw angular velocity ω.

Figure 4:
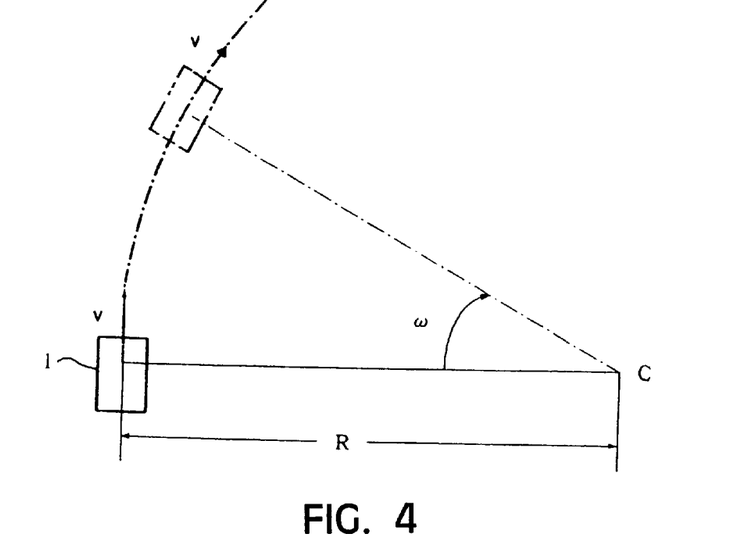
FIG. 4 is an illustration for introducing a formula for calculating turning radius R.

Referring to FIG. 4, when the vehicle 1 goes around a rightward curve at a vehicle speed v, the yaw angular velocity ω of the vehicle body corresponds to angular velocity of turning of the vehicle 1, and therefore the turning radius R can be calculated by the following formula (2).

$$R = v/\omega \tag{2}$$

Figure 5:
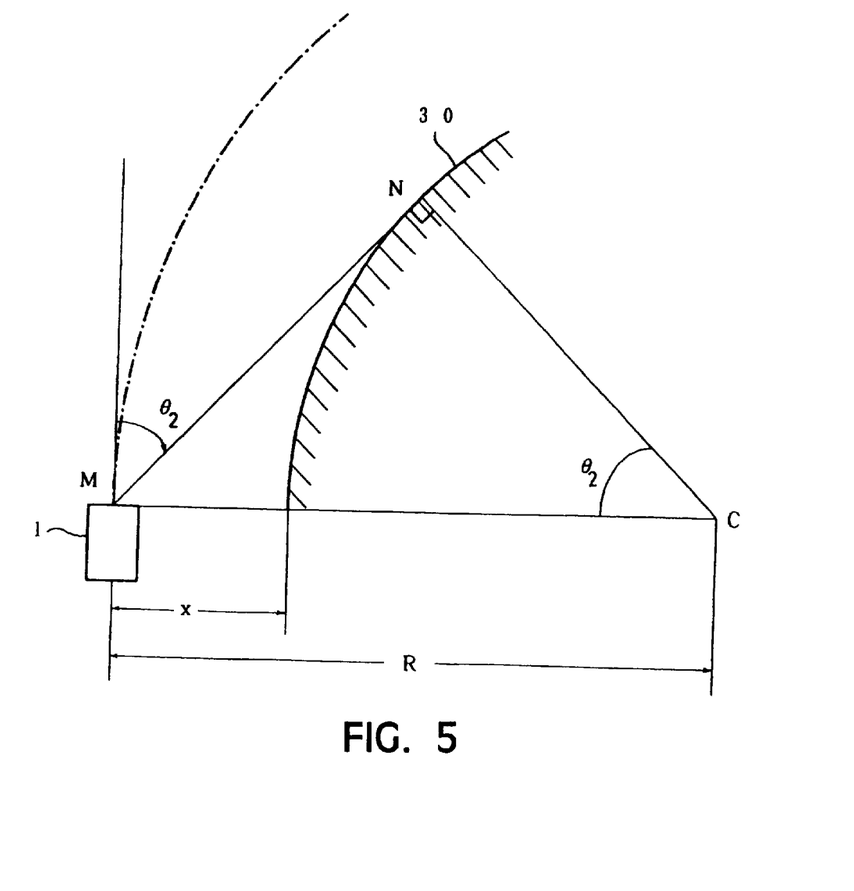
FIG. 5 is an illustration for introducing a formula for calculating a second lighting angle $\theta_2$.

Referring to FIG. 5, a curved road shoulder 30 on the right side of a right curve road is assumed to be an ideal circular arc and a distance from the vehicle 1 to the road shoulder 30 is assumed to be x.

The second lighting angle $\theta_2$ is calculated on the assumption that a direction of a tangent drawn from the vehicle 1 to the circular-arc-shaped road shoulder 30 is the fundamental lighting direction of the head lamp.

If the turning center is denoted by C, the position of the vehicle 1 by M and a contact point of the tangent and the road shoulder 30 by N, the second lighting angle $\theta_2$ is equal to an angle of a right-angled triangle MNC at the apex C. Therefore the next formula is established.

$$\cos \theta_2 = NC/MC = (R-x)/R$$

That is, $$\theta_2 = \cos^{-1}\{(R-x)/R\} \tag{3}$$

The second lighting angle calculating means 12 calculates the second lighting angle $\theta_2$ by the formula (3).

From the first lighting angle $\theta_1$ based on the steering angle φ and the second lighting angle $\theta_2$ based on the yaw angular velocity ω is decided a final lighting angle θ by a lighting angle deciding means 13.

The final lighting angle θ is decided from whether the first lighting angle $\theta_1$ and the second lighting angle $\theta_2$ exist on the same side with respect to the advancing direction of the vehicle or not, that is, the angles $\theta_1$, $\theta_2$ have the same sign or not, and comparison of absolute values $|\theta_1|$ and $|\theta_2|$ of the lighting angles $\theta_1$, $\theta_2$.

A control signal according to the final lighting angle θ obtained in such a manner is outputted to a motor driver 24 which drives the right and left motors 8 for swinging the head lights 2 to a direction corresponding to the lighting angle θ.

Figure 6:
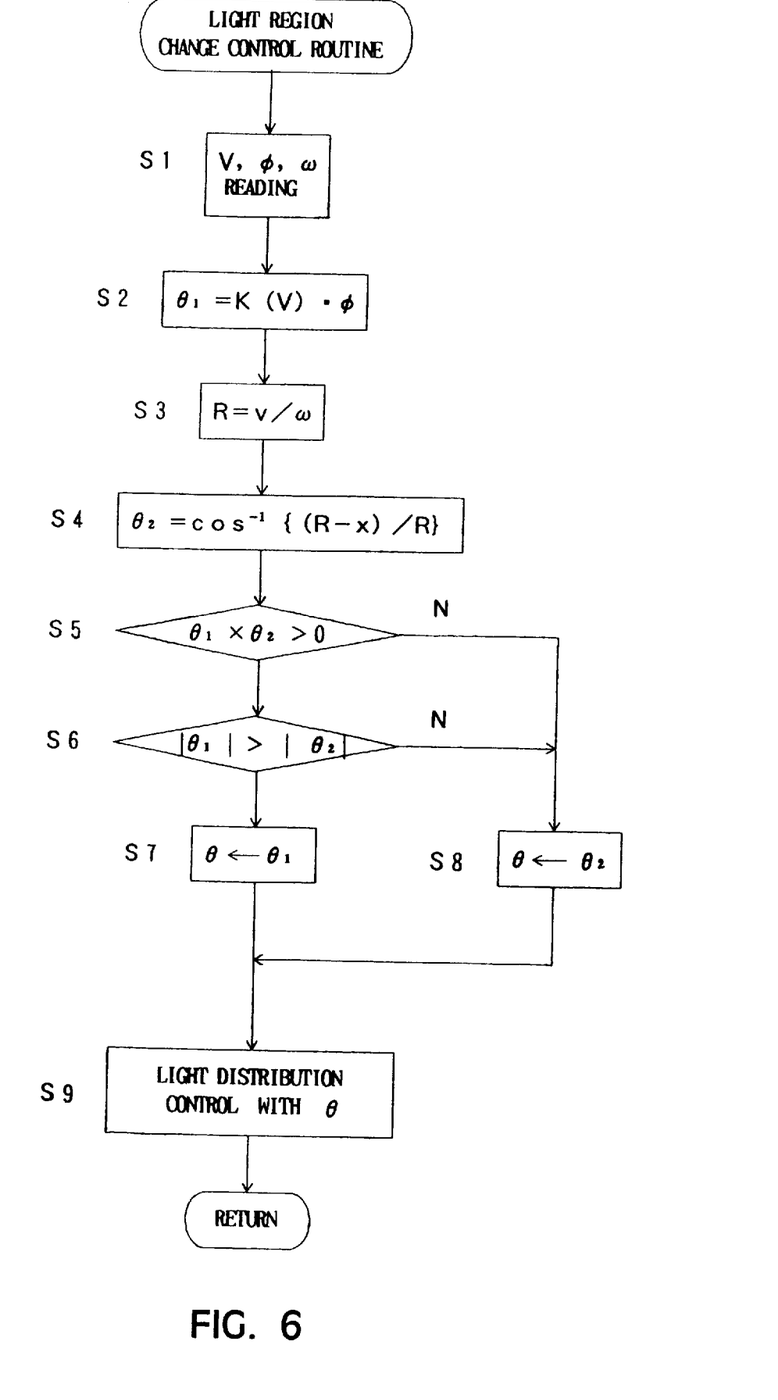
FIG. 6 is a flow chart showing a procedure for controlling change of the lighting region.

The above-mentioned procedures are shown in the flow chart of FIG. 6, inclusively.

At first, the vehicle speed v, the steering angle φ and the yaw angular velocity ω detected by respective sensors are read (Step 1). Then, the first lighting angle $\theta_1$ is calculated from the steering angle φ and the vehicle speed v by the formula (1) (Step 2), the turning radius R is calculated from the yaw angular velocity ω and the vehicle speed v by the formula (2) (Step 3), and the second lighting angle $\theta_2$ is calculated from the turning radius R by the formula (3) (Step 4).

Next, whether a sign of the product $\theta_1 \times \theta_2$ of the first lighting angle $\theta_1$ and the second lighting angle $\theta_2$ is positive or not is discriminated (Step 5).

If the sign is positive, it is judged that the both lighting angles $\theta_1$ and $\theta_2$ are of the same sign and exist on the same right or left side with respect to the advancing direction of the vehicle, and the flow advances to Step 6. If the sign is negative, it is judged that the first and second lighting angles $\theta_1$, $\theta_2$ exist on opposite sides to each other with respect to the advancing direction of the vehicle, and the flow advances to Step 8.

At the Step 8, the second lighting angle $\theta_2$ based on the yaw angular velocity is decided as the final lighting angle θ always.

At the Step 6 where $\theta_1$ and $\theta_2$ are of the same sign and exist on the same side, $|\theta_1|$ is compared with $|\theta_2|$, and if $|\theta_1| > |\theta_2|$, the flow advances to Step 7 and the first lighting angle $\theta_1$ is decided as the final lighting angle θ. If $|\theta_1| \leq |\theta_2|$ at the Step 6, the flow advances to Step 8 and the second lighting angle $\theta_2$ is again decided as the final lighting angle θ.

At the Step 9, the light distribution control is carried out on the basis of the final lighting angle θ decided at the Step 7 or 8.

Change of the lighting angle θ according to the above-mentioned light distribution control will be considered with regard to an example shown in FIGS. 7A to 7D.

Figure 7A:
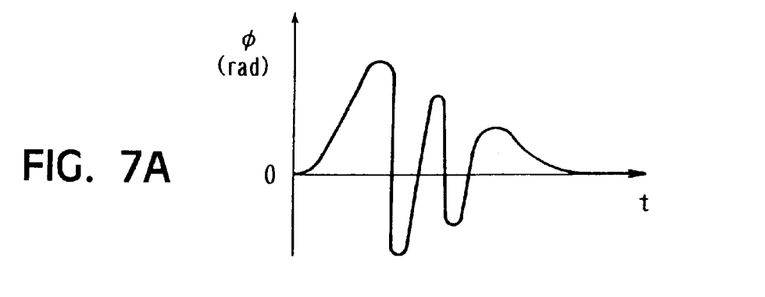
FIGS. 7A to 7D are graphs showing changes of steering angle $\phi$, yaw angular velocity $\omega$, first and second lighting angles $\theta_1$, $\theta_2$ and final lighting angle $\theta$ respectively.
Figure 7B:
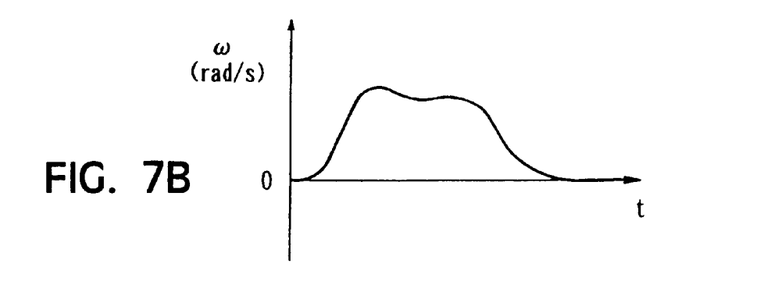

FIG. 7A and FIG. 7B show changes of the steering angle φ and the yaw angular velocity ω respectively, and in these figures the time axes (horizontal axes) coincide with each other.

Referring to FIG. 8, from changes of the steering angle φ and the yaw angular velocity ω of FIGS. 7A and 7B, the following is understood. When the vehicle goes around the rightward curve, the steering wheel is turned to the right to have a positive steering angle φ at first, and the vehicle body yaws somewhat after the change of steering angle φ so that the yaw angular velocity ω increases following increase of the steering angle.

In the meantime, the rear part of the vehicle is swung outside large, and therefore the driver turns the steering wheel to the left or in the opposite direction rapidly for counter-steering to recover direction of the vehicle. Namely, the steering angle φ changes from an upward incline to a downward incline in FIG. 7A. However, the yaw angular velocity ω is maintained due to inertia.

Further, when the direction of the vehicle comes to show some recovery, the driver again turns the steering wheel to the right for going around the rightward curve, but he comes to carry out the counter-steering again soon after. Thus, the steering angle φ swings rightward and leftward in large variations.

However, while the steering angle φ is swinging rightward and leftward as described above, the yaw angular velocity ω is maintained at a certain angular velocity stably in general, and at a time somewhat before the vehicle passes through the curve completely, the yaw angular velocity ω comes to coincide with the steering angle φ.

Figure 7C:
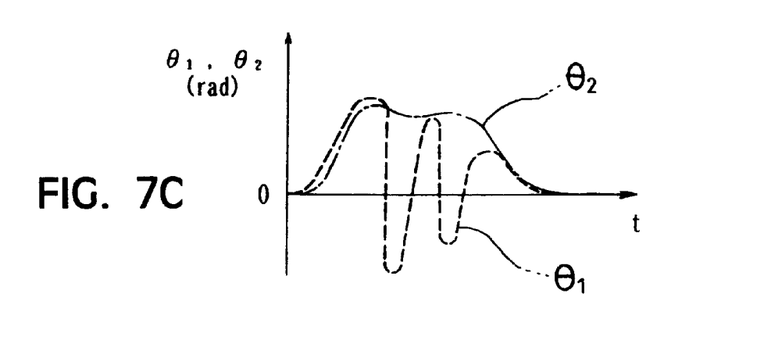

When the vehicle runs in the manner as mentioned above, the first lighting $\theta_1$ and the second lighting angle $\theta_2$ change as shown in FIG. 7C.

The first lighting $\theta_1$ based on the steering angle φ is corrected by the vehicle speed v, but on the assumption that the vehicle speed v does not change so much, the first lighting angle $\theta_1$ changes in the same way as the steering angle φ as shown by the dotted line in FIG. 7C.

The second lighting angle $\theta_2$ based on the yaw angular velocity ω is also influenced by the vehicle speed v, but on the assumption that the vehicle speed v is about constant, the second lighting angle $\theta_2$ changes in the same manner as the yaw angular velocity ω (FIG. 7B) as seen from the formulas (2) and (3). This second lighting angle $\theta_2$ is shown by the dot-dash line in FIG. 7C.

Figure 7D:
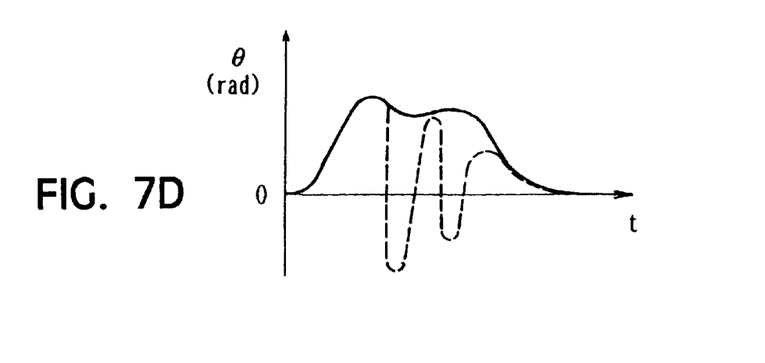

The final lighting angle θ decided by selecting the first lighting angle $\theta_1$ or the second lighting angle $\theta_2$ through the discrimination of Steps 5 and 6 in the flow chart of FIG. 6 is shown in FIG. 7D by the solid line.

In a portion of the solid line in FIG. 7D when the vehicle begins to go around the right curve, a condition of $(\theta_1 > \theta_2 > 0)$ exists so that the flow passes through the route of Steps 5,6 and 7 and the first lighting angle $\theta_1$ is selected as the final lighting angle θ. When the counter-steering is carried out and the relation of the first lighting $\theta_1$ and the second lighting angle $\theta_2$ are reversed to $(0 < \theta_1 < \theta_2)$, the flow passes through the route of Steps 5, 6 and 8 and the second lighting angle $\theta_1$ is selected as the final lighting angle θ.

Thereafter, even if $\theta_1$ becomes negative while $\theta_2$ remains to be positive, the flow passes through the Steps 5 and 8 and the second lighting angle $\theta_2$ is selected as the final lighting angle θ.

Since the actual light distribution control is performed on the basis of the above-mentioned final lighting angle θ, even if the steering wheel is operated rapidly for the counter-steering and the like, change of the lighting region is suppressed pertinently and the driver is given no sense of incongruity.

It is to be noted that if the light distribution control is carried out only in accordance with the first lighting angle $\theta_1$ based on the steering angle φ, the light distribution swings rightward and leftward in large variations in a short time as shown by the dotted line in FIG. 7C so that it gives not only the driver a sense of incongruity, but surrounding vehicle some troubles as well.

In the above embodiment, in a situation where $\theta_1 \times \theta_2 < 0$ and a situation where $\theta_1 \times \theta_2 > 0$ and $|\theta_1| < |\theta_2|$, the second lighting angle $\theta_2$ is selected as the final lighting θ, but in those situations, the final lighting angle θ may be fixed at 0 (rad), namely the direction of the lighting may alternatively be fixed to the direct front of the vehicle body.

Since the lighting region is returned to the direct front of the vehicle body and fixed to prevent rightward and leftward swinging of light distribution when the steering wheel is operated rapidly, the driver is given no sense of incongruity and the direction of the vehicle body can be recognized easily.

Further, the final lighting angle θ may be fixed to the then lighting angle at the time when $|\theta_1|$ and $|\theta_2|$ are reversed in size, i.e., at the time when the first and second lighting angles are changed such that one of the angles which just previously had the larger absolute value now has the smaller absolute value. Even if the steering wheel is operated rapidly, rightward and leftward swinging of the light distribution is prevented so as not to give the driver a sense of incongruity.

Although there has been described what is at present considered to be the preferred embodiment of the invention, it will be understood by persons skilled in the art that variations and modifications may be made thereto without departing from the spirit or essence of the invention. The scope of the invention is, therefore, indicated by the appended claims, rather than by the foregoing description.

What is claimed is:

1. A head lamp device for a vehicle capable of changing a lighting region in front of the vehicle in right and left directions, comprising:

a head lamp;

lighting region changing means for changing a lighting region of the head lamp;

steering angle detecting means for detecting a steering angle;

turning movement detecting means for detecting a turning movement of a body of the vehicle in right and left directions;

first lighting angle calculating means for calculating a first lighting angle based on said steering angle detected by said steering angle detecting means;

second lighting angle calculating means for calculating a second lighting angle based on said turning movement detected by said turning movement detecting means;

lighting angle deciding means for deciding a final lighting angle from said first lighting angle and said second lighting angle; and control means for controlling said lighting region changing means to change said lighting region based on said final lighting angle.

2. A head light lamp device for a vehicle as claimed in claim 1, wherein said lighting angle deciding means decides said second lighting angle based on the turning movement as said final lighting angle when said first and second lighting angles exist on opposite sides to each other with respect to a direct front of the vehicle body, and decides either of said first and second lighting angles which is larger as said final lighting angle when said first and second lighting angles exist on the same side with respect to the direct front of the vehicle body.

3. A head lamp device for a vehicle as claimed in claim 2, further including vehicle speed detecting means for detecting vehicle speed, said turning movement detecting means detects a yaw angular velocity of yawing of the vehicle body, and said second lighting angle calculating means calculates said second lighting angle based on said yaw angular velocity and said vehicle speed detected by said vehicle speed detecting means.

4. A head lamp device for a vehicle as claimed in claim 2, wherein said second lighting angle calculating means calculates a turning radius of the vehicle from said yaw angular velocity and said vehicle speed to obtain said second lighting angle in accordance with said turning radius.

5. A head lamp device for a vehicle as claimed in claim 2, wherein said first lighting angle calculating means corrects said steering angle detected by said steering angle detecting means in accordance with said vehicle speed detected by said vehicle speed detecting means to obtain said first lighting angle.

6. A head lamp device for a vehicle as claimed in claim 1, wherein said lighting angle deciding means decides a direction of a direct front of the vehicle body as a final lighting direction when said first and second lighting angles exist on opposite sides to each other with respect to the direct front of the vehicle body, decides said first lighting angle based on said steering angle as said final lighting angle when said first and second lighting angles exist on the same side with respect to the direct front of the vehicle body and said first lighting angle is larger than said second lighting angle, and decides the direction of the direct front of the vehicle body as the final lighting region when said first and second lighting angles exist on the same side with respect to the direct front of the vehicle body and said first lighting angle is smaller than said second lighting angle.

7. A head lamp device for a vehicle as claimed in claim 6, further including vehicle speed detecting means for detecting vehicle speed, said turning movement detecting means detects a yaw angular velocity of yawing of the vehicle body, and said second lighting angle calculating means calculates said second lighting angle based on said yaw angular velocity and said vehicle speed detected by said vehicle speed detecting means.

8. A head lamp device for a vehicle as claimed in claim 6, wherein said second lighting angle calculating means calculates a turning radius of the vehicle from said yaw angular velocity and said vehicle speed to obtain said second lighting angle in accordance with said turning radius.

9. A head lamp device for a vehicle as claimed in claim 6, wherein said first lighting angle calculating means corrects said steering angle detected by said steering angle detecting means in accordance with said vehicle speed detected by said vehicle speed detecting means to obtain said first lighting angle.

10. A head lamp device for a vehicle as claimed in claim 1, wherein when said first and second lighting angles exist on the same side with respect to a direct front of the vehicle body, if said first lighting angle is larger than said second lighting angle, said first lighting angle based on said steering angle is decided as said lighting angle, and if said first lighting angle is changed to be smaller than said second lighting angle, a lighting angle at the time of change is decided as the final lighting angle and fixed; and thereafter, if said first and second lighting angles change so as to exist on opposite sides to each other with respect to the direct front of the vehicle body, a lighting angle at the time of change is decided as said final lighting angle and fixed.

11. A head lamp device for a vehicle as claimed in claim 10, further including vehicle speed detecting means for detecting vehicle speed, said turning movement detecting means detects a yaw angular velocity of yawing of the vehicle body, and said second lighting angle calculating means calculates said second lighting angle based on said yaw angular velocity and said vehicle speed detected by said vehicle speed detecting means.

12. A head lamp device for a vehicle as claimed in claim 10, wherein said second lighting angle calculating means calculates a turning radius of the vehicle from said yaw angular velocity and said vehicle speed to obtain said second lighting angle in accordance with said turning radius.

13. A head lamp device for a vehicle as claimed in claim 10, wherein said first lighting angle calculating means corrects said steering angle detected by said steering angle detecting means in accordance with said vehicle speed detected by said vehicle speed detecting means to obtain said first lighting angle.

14. A head lamp device for a vehicle as claimed in claim 1, further including vehicle speed detecting means for detecting vehicle speed, said turning movement detecting means detects a yaw angular velocity of yawing of the vehicle body, and said second lighting angle calculating means calculates said second lighting angle based on said yaw angular velocity and said vehicle speed detected by said vehicle speed detecting means.

15. A head lamp device for a vehicle as claimed in claim 14, wherein said second lighting angle calculating means calculates a turning radius of the vehicle from said yaw angular velocity and said vehicle speed to obtain said second lighting angle in accordance with said turning radius.

16. A head lamp device for a vehicle as claimed in claim 15, wherein said first lighting angle calculating means corrects said steering angle detected by said steering angle detecting means in accordance with said vehicle speed detected by said vehicle speed detecting means to obtain said first lighting angle.

17. A head lamp device for a vehicle as claimed in claim 1, wherein said lighting angle deciding means decides said final lighting angle from among said first lighting angle, said second lighting angle and a direction corresponding to a direct front of a body of the vehicle based on values of said first and second lighting angles.

18. A head lamp device for a vehicle as claimed in claim 1, wherein said lighting angle deciding means decides said final lighting angle based on directions of said first and second lighting angles relative to a direct front of the vehicle body and on sizes of said first and second lighting angles relative to each other.

19. A head lamp for a vehicle as claimed in claim 18, wherein said lighting angle deciding means further decides said final lighting angle based on changes in said directions and sizes of said first and second lighting angles over a period of time.

* * * * *

UNITED STATES PATENT AND TRADEMARK OFFICE
CERTIFICATE OF CORRECTION

PATENT NO : 5,909,949
DATED : 08 June 1999
INVENTOR(S): Shinichiro Gotoh

It is certified that error appears in the above-identified patent and that said Letters Patent is hereby corrected as shown below:

Column 1, line numbered between 35 and 36, change "round, however" to --round. However,--;
    line 65, after "lamp" insert a semicolon.

Column 2, line numbered between 33 and 34, change "At that time" to --On the other hand--;
    line numbered between 35 and 36, before "becomes" insert --typically--;
    line 51, change "one" to --the--.

Column 3, 24th line, change "angle" to --angles--.

Column 7, line 4, before "$\theta_1$" insert --angle--;
    line 6, before "$\theta_1$" insert --angle--;
    line 26, before "$\theta_1$" insert --angle--;
    line 29, change "$\theta_1$" to --$\theta_2$--;
    line 45, change "surrounding vehicle" to --drivers of surrounding vehicles--;
    line 49, after "final lighting" insert --angle--.

Column 9, line 34 (claim 10, line 6), before "lighting" insert --final--.

Signed and Sealed this

Thirtieth Day of November, 1999

Q. TODD DICKINSON

Attest:

Attesting Officer

Acting Commissioner of Patents and Trademarks